US012616248B2

(12) United States Patent
Yoon et al.

(10) Patent No.: US 12,616,248 B2
(45) Date of Patent: May 5, 2026

(54) HEATER ASSEMBLY AND AEROSOL GENERATING DEVICE INCLUDING THE SAME

(71) Applicant: KT&G CORPORATION, Daejeon (KR)

(72) Inventors: Sung Wook Yoon, Gyeonggi-do (KR); Yong Hwan Kim, Gyeonggi-do (KR); Seung Won Lee, Gyeonggi-do (KR); Seok Su Jang, Daejeon (KR); Dae Nam Han, Seoul (KR)

(73) Assignee: KT&G CORPORATION, Daejeon (KR)

( * ) Notice: Subject to any disclaimer, the term of this patent is extended or adjusted under 35 U.S.C. 154(b) by 540 days.

(21) Appl. No.: 17/913,113

(22) PCT Filed: Oct. 12, 2021

(86) PCT No.: PCT/KR2021/013993
§ 371 (c)(1),
(2) Date: Sep. 20, 2022

(87) PCT Pub. No.: WO2022/080805
PCT Pub. Date: Apr. 21, 2022

(65) Prior Publication Data

US 2023/0172275 A1 Jun. 8, 2023

(30) Foreign Application Priority Data

Oct. 13, 2020 (KR) ........................ 10-2020-0131818

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *A24F 40/46* (2020.01); *H05B 3/26* (2013.01)

(58) Field of Classification Search
None
See application file for complete search history.

(56) References Cited

U.S. PATENT DOCUMENTS 10,779,571 B2 9/2020 Holoubek et al.
10,993,476 B2 5/2021 Guo
(Continued)

FOREIGN PATENT DOCUMENTS

CN 203646498 U 6/2014
CN 107708453 A 2/2018
(Continued)

OTHER PUBLICATIONS

Japanese Office Action dated Dec. 5, 2023 in Japanese Application No. 2022-563481.
(Continued)

*Primary Examiner* — Phu H Nguyen
(74) *Attorney, Agent, or Firm* — Sughrue Mion, PLLC

(57) ABSTRACT

Disclosed is a heater assembly for accommodating and heating an aerosol generating article, the heater assembly including: an accommodation portion configured to accommodate an end portion of an aerosol generating article; a heating portion arranged to surround another portion of the aerosol generating article; and a combining portion configured to combine the accommodation portion and the heating portion and including engineering plastic, wherein the accommodation portion, the combining portion, and the heating portion are arranged along a longitudinal direction
(Continued)

of the aerosol generating article and form an accommodation space in which the aerosol generating article is accommodated.

13 Claims, 10 Drawing Sheets

(51) Int. Cl.
*A24F 40/46* (2020.01)
*H05B 3/26* (2006.01)

(56) References Cited

U.S. PATENT DOCUMENTS

| | | | |
|---|---|---|---|
| 2015/0020822 A1* | 1/2015 | Janardhan ............ | A61M 15/06 131/328 |
| 2015/0068543 A1 | 3/2015 | Liu | |
| 2018/0289073 A1 | 10/2018 | Guo | |
| 2019/0182909 A1 | 6/2019 | Fursa et al. | |
| 2020/0163380 A1 | 5/2020 | Lee et al. | |
| 2020/0359688 A1 | 11/2020 | Jang et al. | |
| 2021/0045455 A1 | 2/2021 | Davis et al. | |
| 2021/0219617 A1 | 7/2021 | Lee et al. | |
| 2021/0315278 A1 | 10/2021 | Fraser et al. | |
| 2022/0001120 A1 | 1/2022 | Ballesteros Gomez et al. | |
| 2022/0087309 A1 | 3/2022 | Han et al. | |
| 2022/0132931 A1 | 5/2022 | Oh | |
| 2022/0183390 A1 | 6/2022 | Beidelman et al. | |
| 2022/0202091 A1 | 6/2022 | Chong et al. | |

FOREIGN PATENT DOCUMENTS

| | | | |
|---|---|---|---|
| CN | 108471808 | A | 8/2018 |
| CN | 207836767 | U | 9/2018 |
| CN | 207978953 | U | 10/2018 |
| CN | 110494054 | A | 11/2019 |
| CN | 111264910 | A | 6/2020 |
| EP | 3 760 064 | A1 | 1/2021 |
| JP | 2017-225357 | A | 12/2017 |
| JP | 2019-506857 | A | 3/2019 |
| JP | 2019-526237 | A | 9/2019 |
| KR | 10-2017-0110590 | A | 10/2017 |
| KR | 10-2019-0098553 | A | 8/2019 |
| KR | 10-20190093027 | A | 8/2019 |
| KR | 10-2019-0137507 | A | 12/2019 |
| KR | 10-2020-0069112 | A | 6/2020 |
| KR | 10-2020-0099481 | A | 8/2020 |
| KR | 10-2020-0105692 | A | 9/2020 |
| TW | 202034794 | A | 10/2020 |
| WO | 2020/074622 | A1 | 4/2020 |
| WO | 2020/182760 | A1 | 9/2020 |
| WO | 2021/001552 | A1 | 1/2021 |

OTHER PUBLICATIONS

International Search Report for PCT/KR2021/013993 dated Jan. 24, 2022 [PCT/ISA/210].

Written Opinion for PCT/KR2021/013993 dated Jan. 24, 2022 [PCT/ISA/237].

Notice of Non-Final Rejection for KR 10-2020-0131818 dated Oct. 13, 2020.

Extended European Search Report dated Jul. 14, 2023 in Application No. 21880452.4.

Office Action issued Mar. 1, 2025 in Chinese Patent Application No. 202180028133.8.

Communication issued Oct. 29, 2024 in Japanese Application No. 2022-563481.

* cited by examiner

【Figure 1】
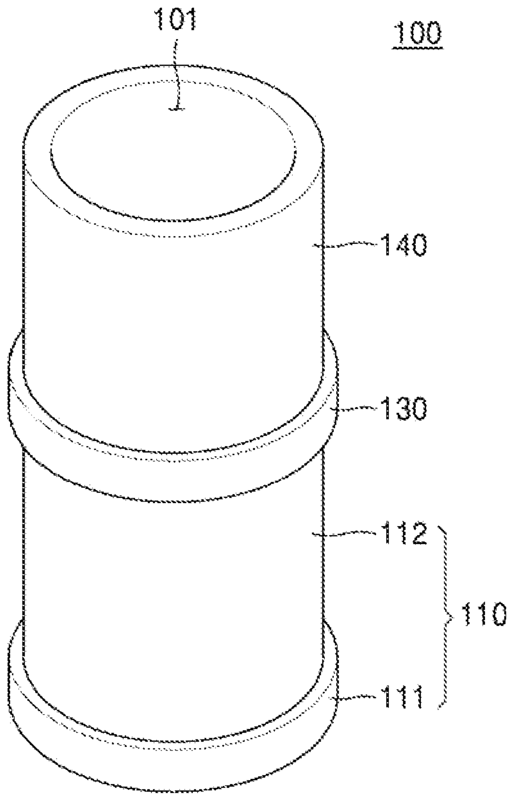

【Figure 2】
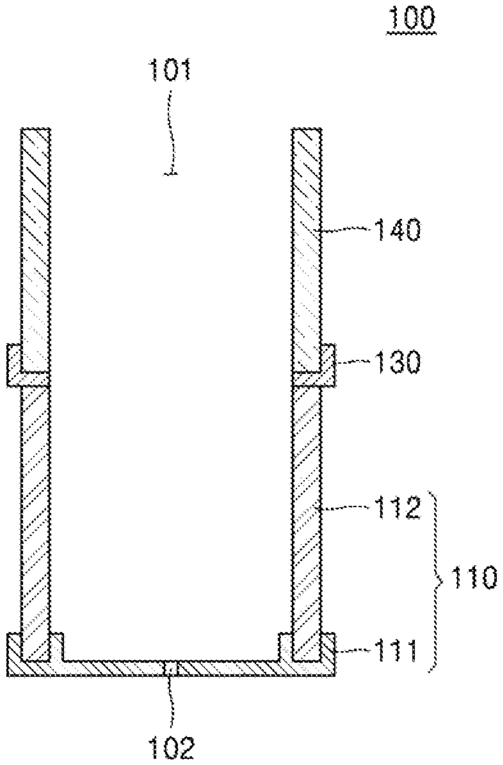
【Figure 3A】
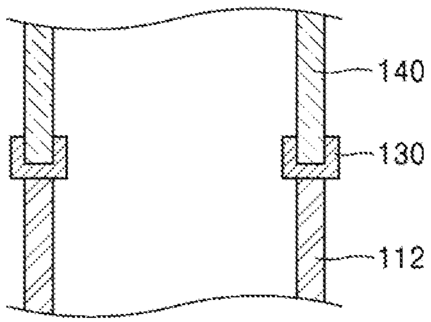
【Figure 3B】
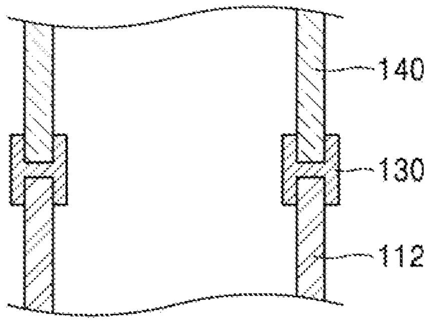

【Figure 4】
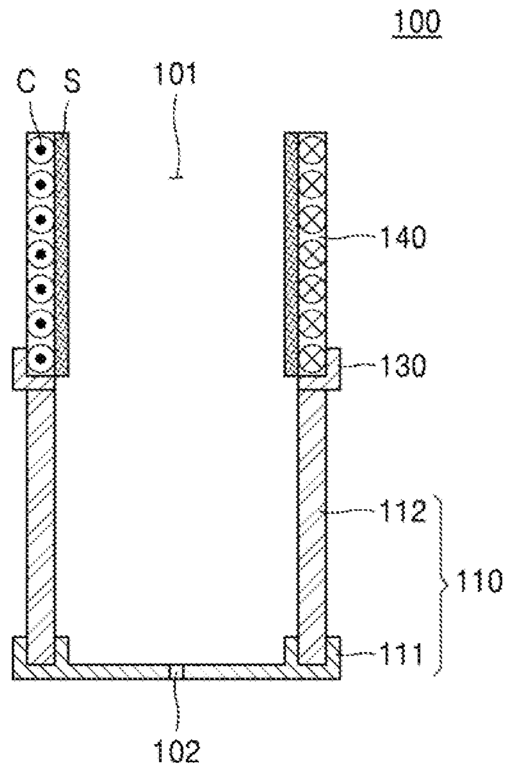
【Figure 5】
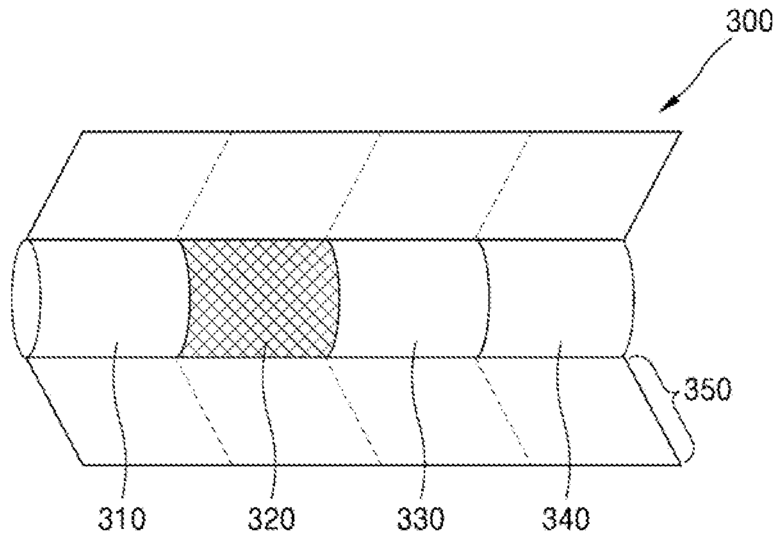

【Figure 6】
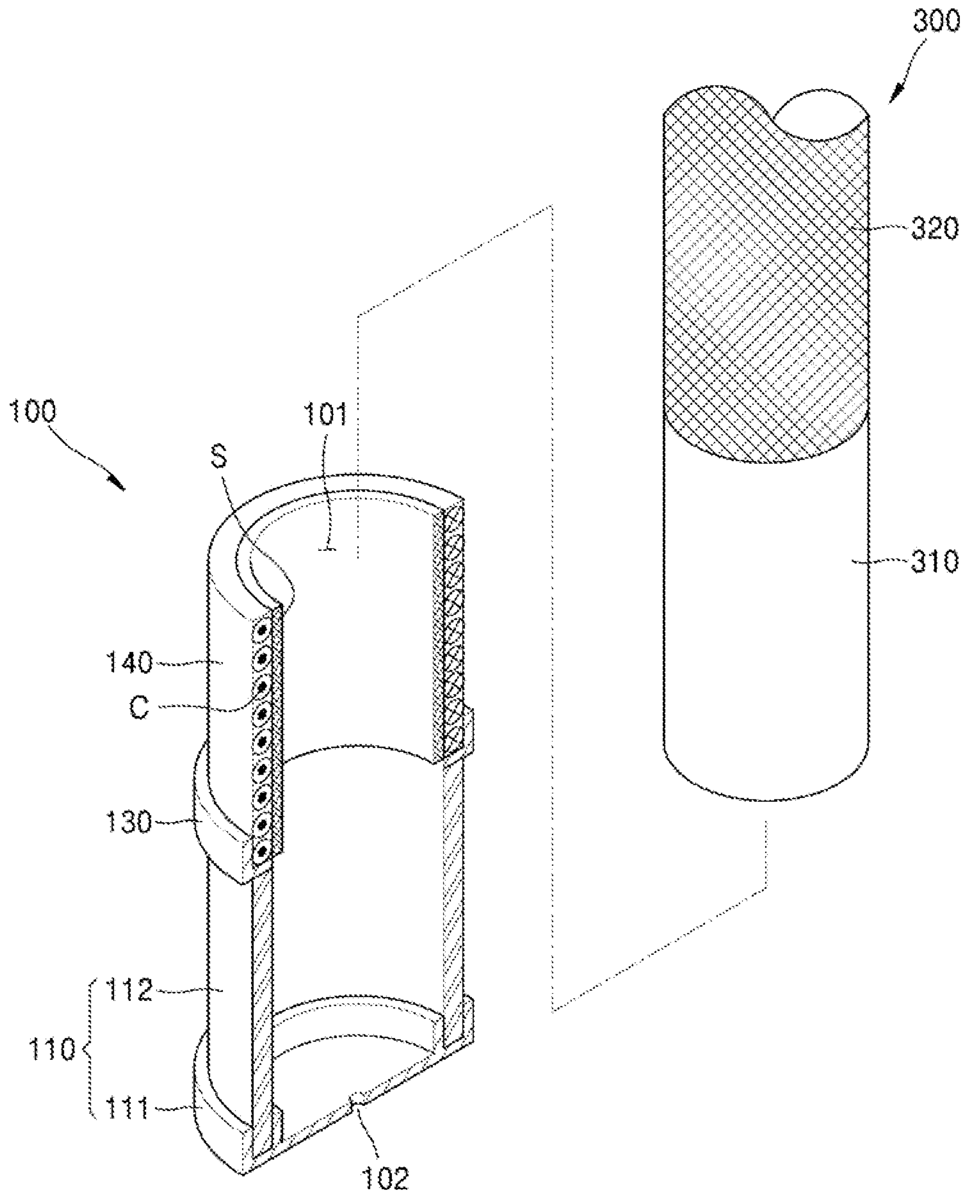

【Figure 7】
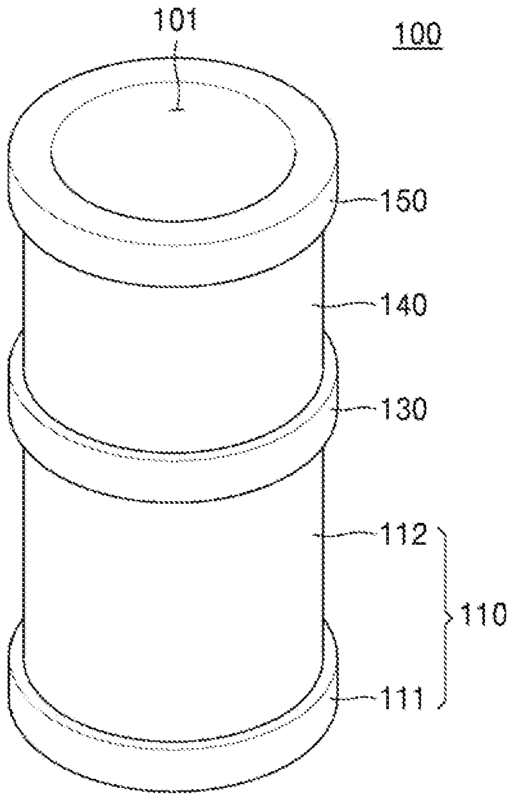

【Figure 8】
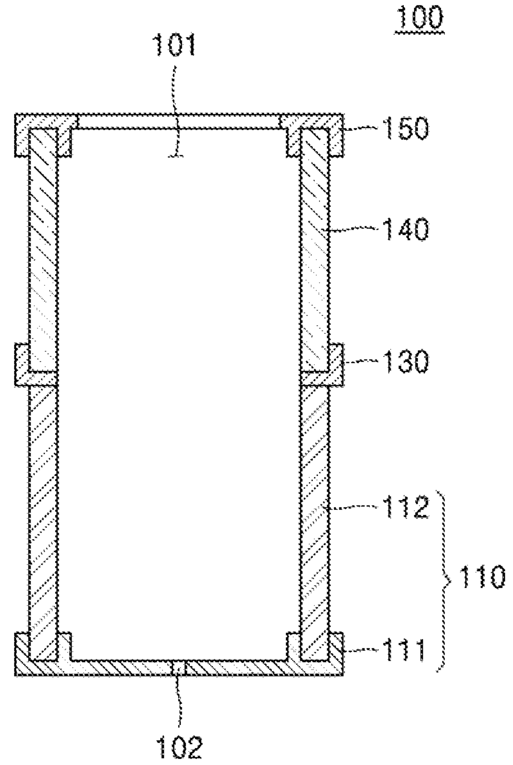
【Figure 9】
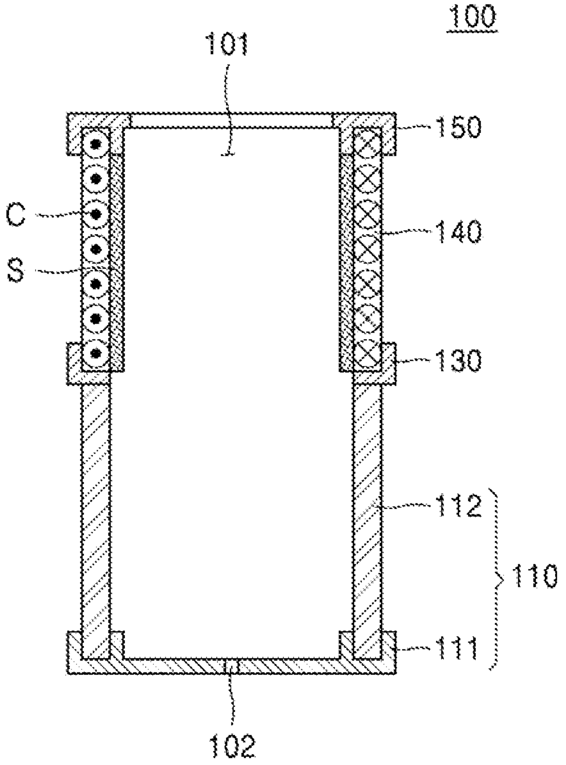

【Figure 10】
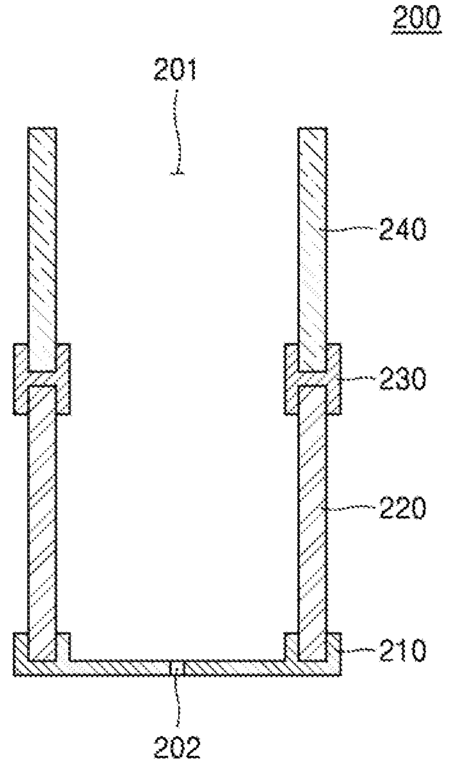
【Figure 11】
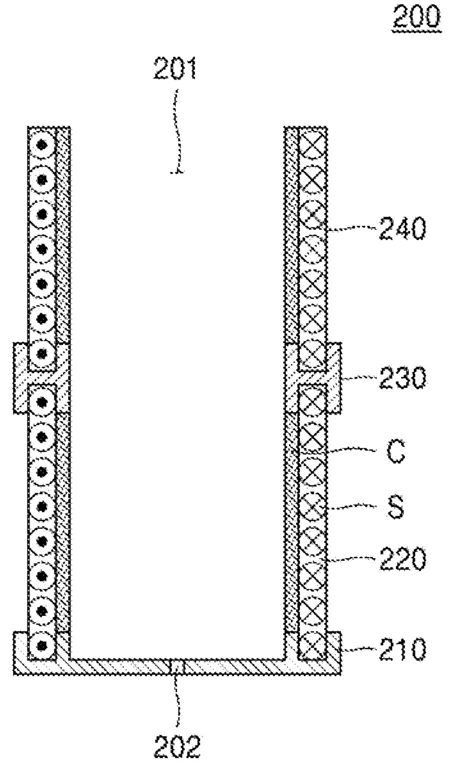

【Figure 12】
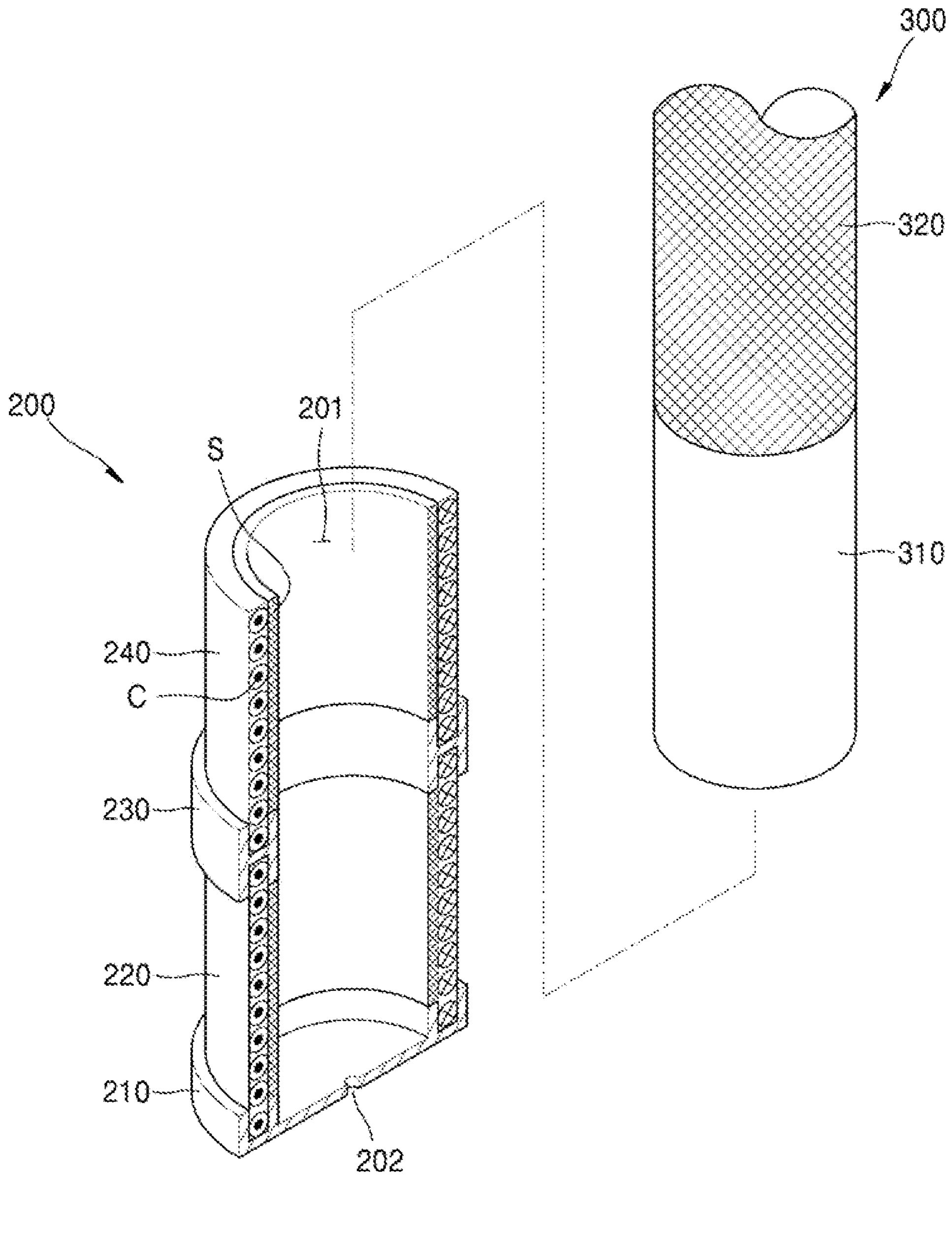

【Figure 13】
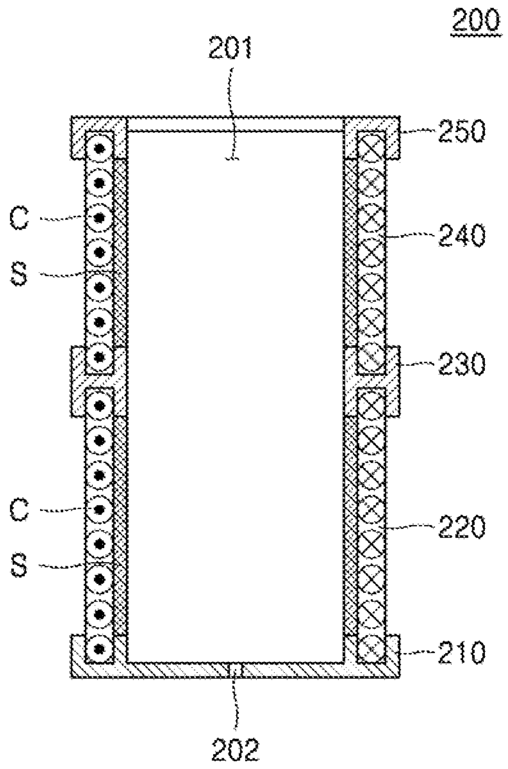
【Figure 14】
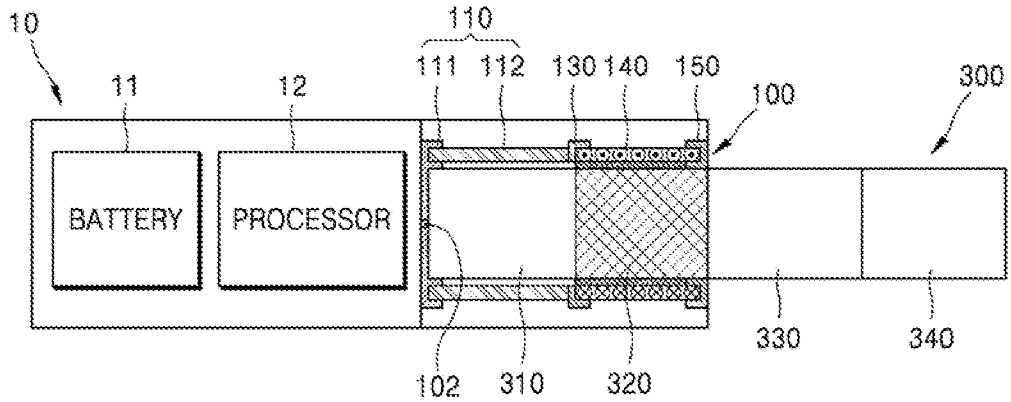

【Figure 15】
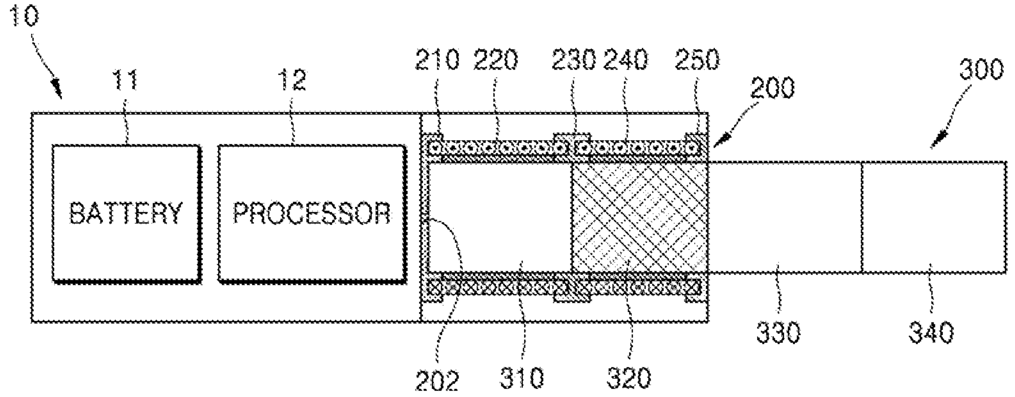

HEATER ASSEMBLY AND AEROSOL GENERATING DEVICE INCLUDING THE SAME

CROSS REFERENCE TO RELATED APPLICATIONS

This application is a National Stage of International Application No. PCT/KR2021/013993 filed Oct. 12, 2021, claiming priority based on Korean Patent Application No. 10-2020-0131818 filed Oct. 13, 2020.

TECHNICAL FIELD

One or more embodiments of the present disclosure relate to a heater assembly and an aerosol generating device including the same.

BACKGROUND ART

Recently, the demand for alternative methods to overcome the disadvantages of traditional cigarettes has increased. For example, there is growing demand for an aerosol generating device which generates aerosol by heating an aerosol generating material, rather than by combusting cigarettes. Accordingly, research on smoking articles or devices that operate in various ways has been actively conducted.

DISCLOSURE

Technical Problem

Coupling components may be used in aerosol generating devices to minimize a gap between components and to improve a coupling force and a sealing force. In general, these coupling components are made of silicon, rubber, etc.

In an aerosol generating device, high temperature heating frequently occurs during use. Materials such as silicon and rubber, which are generally used as coupling components, have low thermal resistance, and thus the shape may be deformed at high temperatures. In this case, the coupling force and the sealing force between the components may be deteriorated, and the high-temperature aerosol may leak into the inside of the aerosol generating device. As a result, the service life of the aerosol generating device may be shortened.

Technical Solution

A heater assembly for accommodating and heating an aerosol generating article according to an embodiment may include an accommodation portion configured to accommodate an end portion of an aerosol generating article, a heating portion arranged to surround another portion of the aerosol generating article and configured to heat the aerosol generating article, and a combining portion configured to combine the accommodation portion and the heating portion and including engineering plastic, wherein the accommodation portion, the combining portion, and the heating portion are arranged along a longitudinal direction of the aerosol generating article and form an accommodation space in which the aerosol generating article is accommodated.

A heater assembly for accommodating and heating an aerosol generating article according to another embodiment may include an accommodation portion configured to accommodate an end portion of an aerosol generating article, a first heating portion arranged to surround a first portion of the aerosol generating article, and configured to heat the aerosol generating article, a second heating portion arranged to surround at least another portion of the aerosol generating article in a lengthwise direction and configured to heat the aerosol generating article a combining portion configured to combine the first heating portion and the second heating portion and the heating portion and including engineering plastic, wherein the accommodation portion, the first heating portion, the combining portion, and the second heating portion are arranged along a longitudinal direction of the aerosol generating article and form an accommodation space in which the aerosol generating article is accommodated.

An aerosol generating device according to an embodiment may include a heater assembly, a battery configured to supply power to the heater assembly, and a processor configured to control the power supplied to the heater assembly.

Means for solving the problem are not limited to the above description, and may include all matters that can be inferred by a person skilled in the art throughout the present specification.

Advantageous Effects

According to a heater assembly according to embodiments, engineering plastic having excellent thermal resistance is used to combine components. Therefore, coupling and sealing of components of the heater assembly may be stably maintained despite high-temperature heating. Also, the high-temperature aerosol generated in the heater assembly may be prevented from leaking. Therefore, shortening of the service life of the aerosol generating device due to heat may be prevented.

Also, different portions of the aerosol generating article may be heated at different temperatures. Accordingly, nicotine transfer in an aerosol generating article may be promoted and a sufficient amount of an aerosol may be generated and provided to a user.

The effects of the embodiments are not limited to the above description and may include all effects that may be inferred from the embodiments described below and the accompanying drawings.

DESCRIPTION OF DRAWINGS

FIG. 1 is a perspective view schematically illustrating a heater assembly according to an embodiment;

FIG. 2 is a cross-sectional view schematically illustrating the heater assembly according to the embodiment of FIG. 1;

FIGS. 3A and 3B illustrate a combining portion of the heater assembly according to different embodiments;

FIG. 4 is a cross-sectional view schematically illustrating a heater assembly according to another embodiment;

FIG. 5 is a view schematically illustrating a structure of an aerosol generating article according to an embodiment;

FIG. 6 is a view for describing a procedure in which the aerosol generating article of FIG. 5 is accommodated in and heated by the heater assembly according to the embodiment of FIG. 4;

FIG. 7 is a perspective view schematically illustrating a heater assembly according to another embodiment;

FIG. 8 is a cross-sectional view schematically illustrating the heater assembly according to the embodiment of FIG. 7;

FIG. 9 is a cross-sectional view schematically illustrating a heater assembly according to another embodiment;

FIG. 10 is a cross-sectional view schematically illustrating a heater assembly according to another embodiment;

FIG. 11 is a cross-sectional view schematically illustrating a heater assembly according to another embodiment;

FIG. 12 is a view for describing a procedure in which the aerosol generating article of FIG. 5 is accommodated in and heated by the heater assembly according to the embodiment of FIG. 11;

FIG. 13 is a cross-sectional view schematically illustrating a heater assembly according to another embodiment;

FIG. 14 is a view illustrating a state in which the aerosol generating article of FIG. 5 is inserted into an aerosol generating device including the heater assembly according to the embodiment of FIG. 9; and FIG. 15 is a view illustrating a state in which the aerosol generating article of FIG. 5 is inserted into an aerosol generating device including the heater assembly according to the embodiment of FIG. 13.

BEST MODE

A heater assembly for accommodating and heating an aerosol generating article according to an embodiment includes an accommodation portion configured to accommodate at least a portion of an end of an aerosol generating article, a heating portion arranged to surround at least a portion of the aerosol generating article in a lengthwise direction and configured to heat the aerosol generating article, and a combining portion configured to combine the accommodation portion and the heating portion and including engineering plastic, wherein the accommodation portion, the combining portion, and the heating portion are arranged along a longitudinal direction of the aerosol generating article and form an accommodation space in which the aerosol generating article is accommodated.

The accommodation portion may have a length of 5 mm to 10 mm based on a longitudinal direction of the accommodation space.

The engineering plastic may include at least one selected from the group consisting of polyether ether ketone (PEEK), poly sulfone (PSU), polyether imide (PEI), polyether sulfone (PES), polyphenylene sulfone (PPS), polyimide (PI), and liquid crystal polymer (LCP).

The combining portion may extend in a longitudinal direction of the accommodation space to contact at least one of an inner side surface of the heating portion and an outer side surface of the heating portion.

The heating portion may include a susceptor arranged on an inside facing the aerosol generating article and configured to generate heat by an external magnetic field, and a coil arranged outside the susceptor and configured to generate an induced magnetic field.

The heat assembly may further include a heat insulator combined with the heating portion and configured to block at least a portion of an end of the accommodation space and to block movement of heat inside the accommodation space to the outside.

A heater assembly for accommodating and heating an aerosol generating article according to another embodiment includes an accommodation portion configured to accommodate at least a portion of an end of an aerosol generating article, a first heating portion arranged to surround at least a portion of the aerosol generating article in a lengthwise direction and configured to heat the aerosol generating article, a second heating portion arranged to surround at least another portion of the aerosol generating article in a lengthwise direction and configured to heat the aerosol generating article a combining portion configured to combine the first heating portion and the second heating portion and the heating portion and including engineering plastic, wherein the accommodation portion, the first heating portion, the combining portion, and the second heating portion are arranged along a longitudinal direction of the aerosol generating article and form an accommodation space in which the aerosol generating article is accommodated.

The first heating portion may have a length of 5 mm to 10 mm based on a longitudinal direction of the accommodation space.

The engineering plastic may include at least one selected from the group consisting of polyether ether ketone (PEEK), poly sulfone (PSU), polyether imide (PEI), polyether sulfone (PES), polyphenylene sulfone (PPS), polyimide (PI), and liquid crystal polymer (LCP).

The combining portion may extend in a longitudinal direction of the accommodation space to contact at least one of an inner side surface of the first heating portion and an outer side surface of the first heating portion, and may extend in a longitudinal direction of the accommodation space to contact at least one of an inner side surface of the second heating portion and an outer side surface of the second heating portion.

At least one of the first heating portion and the second heating portion may include a susceptor that is arranged on an inside facing the aerosol generating article and is configured to heat by an external magnetic field, and a coil arranged outside the susceptor and configured to generate an induced magnetic field.

The first heating portion and the second heating portion may heat the aerosol generating article at different temperatures from each other.

The heat assembly may further include a heat insulator combined with the second heating portion and configured to block at least a portion of an end of the accommodation space and to block movement of heat inside the accommodation space to the outside.

An aerosol generating device according to an embodiment may include a heater assembly, a battery configured to supply power to the heater assembly, and a processor configured to control the power supplied to the heater assembly.

MODE FOR INVENTION

With respect to the terms used to describe in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

Throughout the specification, an 'embodiment' is an arbitrary division for easily describing the invention in the present disclosure, and each of the embodiments is not necessarily mutually exclusive. For example, configurations disclosed in an embodiment may be applied and/or implemented in other embodiments and may be applied and/or implemented with changes without departing from the scope of the present disclosure.

Also, the terminology used in the present specification is for describing the embodiments and is not intended to limit the embodiments. In the present disclosure, the singular includes the plural unless otherwise specified.

In addition, unless explicitly described to the contrary, the word “comprise” and variations such as “comprises” or “comprising” will be understood to imply the inclusion of stated elements but not the exclusion of any other elements. In addition, the terms “-er”, “-or”, and “module” described in the specification mean units for processing at least one function and operation and can be implemented by hardware components or software components and combinations thereof.

As used herein, expressions such as “at least one of,” when preceding a list of elements, modify the entire list of elements and do not modify the individual elements of the list. For example, the expression, “at least one of a, b, and c,” should be understood as including only a, only b, only c, both a and b, both a and c, both b and c, or all of a, b, and c.

Also, in the present specification, an aerosol generating device may be a device that generates an aerosol using an aerosol generating material such that the aerosol may be directly inhaled into the user’s lungs through the user’s mouth.

Also, as used herein, the terms including an ordinal number, such as “first” or “second”, may be used to describe various components, but the components should not be limited by the terms. The terms are used only for the purpose of distinguishing one component from other components.

Throughout the specification, an “aerosol generating article” refers to an article used for smoking. For example, the aerosol generating article may be a general combustion type cigarette that is ignited and burned, or a heated cigarette that is heated without combustion by the aerosol generating device. In another example, the aerosol generating article may be a cartridge containing an aerosol generating material in the form of a liquid. One or more aerosol generating articles (e.g., a cigarette and a cartridge) may be used in the aerosol generating device.

The term “downstream” refers to a direction in which the aerosol moves toward the mouth of a user in the aerosol generating article (e.g., cigarette) or in the aerosol generating device during smoking, and the term “upstream” refers to its opposite direction. The terms “downstream” and “upstream” may be used to indicate relative positions of components of the aerosol generating article or the aerosol generating device. For example, a portion of a cigarette that is put in the user’s mouth corresponds to a downstream end of the cigarette.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments will be described in detail with reference to the drawings.

FIG. 1 is a perspective view schematically illustrating a heater assembly 100 according to an embodiment, and FIG. 2 is a cross-sectional view schematically illustrating the heater assembly 100 according to the embodiment of FIG. 1.

The heater assembly 100 according to the embodiment shown in FIGS. 1 and 2 may be installed in an aerosol generating device and may perform a function of accommodating and heating an aerosol generating article to generate an aerosol.

Referring to FIGS. 1 and 2, the heater assembly 100 may include an accommodation portion 110, a combing portion 130, and a heating portion 140. However, embodiments are not limited thereto, and other general elements than the elements shown in FIG. 1 may be further included in the heater assembly 100.

The accommodation portion 110, the combining portion 130, and the heating portion 140 may be arranged in a longitudinal direction of the aerosol generating article and may form an accommodation space 101 in which the aerosol generating article is accommodated. For example, the accommodation space 101 may have a cylindrical shape. In this case, the diameter of the accommodation space 101 may be substantially the same as or slightly greater than the diameter of the aerosol generating article having a cylindrical shape.

The accommodation portion 110 may accommodate at least a portion of the aerosol generating article including an upstream end of the aerosol generating article. The longitudinal direction of the aerosol generating article means a direction in which the length of the aerosol generating article extends, or a direction in which the aerosol generating article is inserted into the aerosol generating device.

The accommodation portion 110 may be arranged to surround the end portion of the aerosol generating article. The accommodation portion 110 may be integrally formed as one element, or may be formed by combining a plurality of elements.

More specifically, the accommodation portion 110 may include an end accommodation portion 111 and a side accommodation portion 112. The end accommodation portion 111 may support the end (i.e., upstream end) of the accommodated aerosol generating article. The side accommodation portion 112 may be combined with the end accommodation portion 111 such that the side accommodation portion 112 surrounds a portion of the side surface of the aerosol generating article near its upstream end.

As illustrated in FIGS. 1 and 2, the side accommodation portion 112 may have a cylindrical shape, and one end of the side accommodation portion 112 may be engaged with a groove formed in the end accommodation portion 111 such that the side accommodation portion 112 is coupled to the end accommodation portion 111. However, the shapes of the end accommodation portion 111 and the side accommodation portion 112 are not limited thereto, and the end accommodation portion 111 and the side accommodation portion 112 may be modified in various shapes in consideration of easiness and convenience of coupling of the end accommodation portion 111 and the side accommodation portion 112.

The accommodation portion 110 may include at least one plastic selected from the group consisting of polycarbonate (PC), acrylonitrile-butadiene-styrene resin (ABS), polyether ether ketone (PEEK), poly sulfone (PSU), liquid crystal polymer (LCP), polyetherimide (PEI), polyether sulfone (PES), polyphenylene sulfone (PPS), and polyimide (PI).

The end accommodation portion 111 and the side accommodation portion 112 may include the same plastic or different plastics. For example, the end accommodation portion 111 and the side accommodation portion 112 may include PC.

In another example, the side accommodation portion 111 may include PC, and the side accommodation portion 112 may include ABS. The plastic included in the accommodation portion 110 may be properly selected in consideration of the heating temperature of the heating portion 140 and thermal resistance of the plastic.

The accommodation portion 110 may have a length of 5 mm to 10 mm along the longitudinal direction of the accommodation space 101. The longitudinal direction of the accommodation space 101 means a direction in which the length of the accommodation space 101 extends or a direction in which the accommodated aerosol generating article is inserted into the accommodation space 101.

A first portion of the aerosol generating article may be accommodated in the accommodation portion 110. The first portion of the aerosol generating article may have a length of 5 mm to 10 mm along the longitudinal direction of the aerosol generating article. That is, the length of the first portion of the aerosol generating article and the length of the accommodation portion 110 may correspond to each other.

The first portion of the aerosol generating article may include an aerosol generating material, and a second portion of the aerosol generating article may include a tobacco material. As the first portion and the second portion of the aerosol generating article include different materials, heating temperature needs to be differently adjusted. To this end, the length of the accommodation portion 110 may be set to be same as the length of the first portion of the aerosol generating article so that heat applied to the first portion and the second portion of the aerosol generating article by the heater assembly 100 may be easily adjusted. As a result, the heater assembly 100 according to the embodiment may improve nicotine transfer in the aerosol generating article and generate a sufficient amount of an aerosol. A detailed description of the first portion and the second portion of the aerosol generating article will be provided later.

The accommodation portion 110 may include an air hole 102 for introducing air from the outside when the user puffs. For example, the air hole 102 may be formed in the end accommodation portion 111. The air introduced into the accommodation portion 110 may pass through the aerosol generating article so that an aerosol is generated.

The combining portion 130 may include engineering plastic and may be arranged between the accommodation portion 110 and the heating portion 140 to combine the accommodation portion 110 with the heating portion 140. The combining portion 130 may combine the accommodation portion 110 with the heating portion 140 and simultaneously may effectively seal the accommodation space 101.

Engineering plastic refers to plastic that has excellent strength and elasticity. Engineering plastic may be used even under high-temperature conditions. Plastic materials having the operating temperature above 100° C. classified as engineering plastic.

In general, silicon or rubber included in coupling components has low thermal resistance. Thus, when heat is applied, the physical shape of silicon or rubber may be deformed. As a result, the coupling force and the sealing force may be reduced.

The combining portion 130 contacts the heating portion 140 which receives high-temperature heat. Therefore, the combining portion 130 is required to have excellent thermal resistance. If a high-temperature aerosol generated in the aerosol generating article leaks to the outside of the accommodation space 101 of the heater assembly 100, components of the aerosol generating device may be deformed by heat, which may reduce service life and durability of the aerosol generating device.

According to an embodiment, the combining portion 130 may include engineering plastic having excellent thermal resistance such that excellent coupling force and sealing force are maintained in spite of high-temperature heating of the heating portion 140. Accordingly, it is possible to maintain the inside of the accommodation space 101 of the heater assembly 100 at a uniform temperature. Also, the decrease of the useful life of the aerosol generating device due to leakage of the aerosol may be prevented. Also, the aerosol generated in the aerosol generating article may be completely delivered to the user without a leak.

The engineering plastic may be at least one selected from the group consisting of PEEK, PSU, PEI, PES, PPS, PI, and LCP. However, embodiments are not limited thereto, and engineering plastic having sufficient thermal resistance may be used without limitation.

FIGS. 3A and 3B illustrate the combining portion 130 of the heater assembly 100 according to different embodiments.

Referring to FIGS. 3A and 3B, the combining portion 130 may extend in the longitudinal direction of the accommodation space 101 to contact an inner side surface and/or an outer side surface of the side accommodation portion 112. As the contact area between the combining portion 130 and the accommodation portion 110 increases, the coupling force between the combining portion 130 and the accommodation portion 110 may be increased.

Also, the combining portion 130 may extend in the longitudinal direction of the accommodation space 101 to contact the inner side surface and/or the outer side surface of the heating portion 140. As the contact area between the combining portion 130 and the heating portion 140 increases, the coupling force between the combining portion 130 and the accommodation portion 110 may be increased. Also, the sealing force of the accommodation space 101 is improved, and thus the heat supplied from the heating portion 140 to the accommodation space 101 may be prevented from leaking to the outside of the accommodation space 101.

The combining portion 130 may extend along the circumferential direction at the end of the heating portion 140 having the cylindrical shape. That is, the combining portion 130 may be combined with the entire end of the heating portion 140 so that heat may be effectively prevented from leaking to the outside through a gap between the heating portion 140 and the accommodation portion 110. Also, it is possible to heat the first portion of the aerosol generating article accommodated in the accommodation portion 110 and the second portion of the aerosol generating article accommodated in the heating portion 140 at different temperatures.

According to embodiments, the combining portion 130 may be in contact with the outer side surface of the accommodated aerosol generating article. The outer side surface of the aerosol generating article that contacts the combining portion 130 may include a boundary between the first portion and the second portion of the aerosol generating article.

The heating portion 140 may be arranged to surround at least a portion of the accommodated aerosol generating article and may heat the aerosol generating article. For example, the heating portion 140 may have a cylindrical shape, and at least a portion of the aerosol generating article may be accommodated in the heating portion 140 having the cylindrical shape. Thus, when the aerosol generating article is inserted into the accommodation space 101, the heating portion 140 may be located outside the aerosol generating article.

The heating portion 140 may be an electro-resistive heater. For example, the heating portion 140 may include an electrical conductive track, and as current flows through the electrical conductive track, the heating portion 140 may be heated. However, the heating portion 140 is not limited to the above-described example as long as the heating portion 140 may be heated to a desired temperature. Here, the desired temperature may be pre-set in the heater assembly 100 and may also be set by the user.

In another example, the heating portion 140 may be an inductive heating type heater.

FIG. 4 is a cross-sectional view schematically illustrating a heater assembly 100 including an induction heating type heating portion 140 according to another embodiment.

Referring to FIG. 4, the heating portion 140 may include a susceptor S that is arranged on the inside of the heating portion 140 to face the aerosol generating article and generates heat by induction heating in an alternating magnetic field. The coil C may be arranged outside the susceptor S to induce an alternating magnetic field.

The induction heating method may include a method of generating heat from a magnetic substance by applying an alternating magnetic field.

When an alternating magnetic field is applied to a magnetic substance, energy loss may occur in the magnetic substance due to eddy current loss and hysteresis loss. The lost energy may be released from the magnetic substance as thermal energy. As the amplitude or frequency of the alternating magnetic field applied to the magnetic substance increases, the heat energy released from the magnetic substance also increases. The heater assembly 100 may discharge thermal energy by applying an alternating magnetic field to a magnetic body, and may transfer the thermal energy discharged from the magnetic body to the aerosol generating article.

At least a portion of the susceptor S may be formed of a ferromagnetic substance. The susceptor S may include metal or carbon. The susceptor S may include at least one of ferrite, ferromagnetic alloy, stainless steel, and aluminum (Al). In addition, the susceptor S may include at least one of ceramic (such as graphite, molybdenum, silicon carbide, niobium, nickel alloy, metal film, zirconia, or the like), transition metal (such as nickel (Ni) or cobalt (Co)), and metalloid (such as boron (B) or phosphorus (P)).

The coil C may apply the alternating magnetic field to the heater assembly 100. When power is supplied to the coil C, a magnetic field may be formed inside the coil C. When an alternating current (AC) is applied to the coil C, the direction of the magnetic field formed inside the coil C may be continuously changed. When the susceptor S is located inside the coil C and is exposed to the alternating magnetic field in which the direction of the susceptor S is periodically changed, the susceptor S may heat, and the aerosol generating article accommodated in the heater assembly 100 may be heated.

The coil C may be arranged at a position suitable for applying the alternating magnetic field to the susceptor S. For example, the susceptor S may be arranged on the inside of the heating portion 140 to face the aerosol generating article, and the coil C may be arranged outside the susceptor S. In this way, the alternating magnetic field induced by the coil C may be effectively applied to the susceptor S.

The degree to which the heater assembly 100 heats the aerosol generating article may change according to the amplitude or frequency of the alternating magnetic field formed by the coil C. Because the amplitude or frequency of the magnetic field by the coil C may be changed by power applied to the coil C, the aerosol generating device may adjust power applied to the coil C, thereby controlling heating of the aerosol generating article. For example, the aerosol generating device may control the amplitude and frequency of the alternating current applied to the coil C.

For example, the coil C may be configured with a solenoid. The coil C may be a solenoid wound along a side surface of the accommodation space 101. The aerosol generating article may be accommodated in the inner space of the solenoid. The solenoid may include copper (Cu), but it is not limited thereto. The solenoid may include any one of silver (Ag), gold (Au), aluminum (Al), tungsten (W), zinc (Zn), and nickel (Ni) or an alloy containing at least one thereof.

FIG. 5 is a view schematically illustrating the structure of an aerosol generating article 300 according to an embodiment.

Referring to FIG. 5, the aerosol generating article 300 may include a first portion 310, a second portion 320, a third portion 330, and a fourth portion 340. According to an embodiment, the first portion 310 may include an aerosol generating material, the second portion 320 may include a tobacco material and a moisturizing agent, the third portion 330 may cool an airflow passing through the first portion 310 and the second portion 320, and the fourth portion 340 may include a filter material.

Referring to FIG. 5, the first portion 310, the second portion 320, the third portion 330, and the fourth portion 340 may be sequentially arranged along the longitudinal direction of the aerosol generating article 300. Here, the longitudinal direction of the aerosol generating article 300 may be a direction in which the length of the aerosol generating article 300 extends. For example, the longitudinal direction of the aerosol generating article 300 may be a direction from the first portion 310 toward the fourth portion 340. Thus, the airflow including an aerosol generated from at least one of the first portion 310 and the second portion 320 may sequentially pass through the first portion 310, the second portion 320, the third portion 330, and the fourth portion 340. Thus, a smoker may inhale the aerosol from the fourth portion 340.

The first portion 310 may include an aerosol generating material. Also, the first portion 310 may include other additives, such as flavors, a wetting agent, and/or organic acid, or a flavoring liquid, such as menthol or a moisturizer. Here, the aerosol generating material may include, for example, at least one of glycerin, propylene glycol, ethylene glycol, dipropylene glycol, diethylene glycol, triethylene glycol, tetraethylene glycol, and oleyl alcohol. However, the present disclosure is not limited to the above-described example, and the present disclosure may include all of various types of aerosol generating materials that are widely known in the technical field.

The first portion 310 may include a crimped sheet, and the aerosol generating material may be included in the first portion 310 impregnated in the crimped sheet. Also, other additives, such as the flavored material such as flavors, a wetting agent, and/or organic acid, and a flavoring liquid may be included in the first portion 310 as absorbed into the crimped sheet.

The crimped sheet may be a sheet formed of a polymer material. For example, the polymer material may include at least one of cellulose acetate, lyocell, and polyactic acid. For example, the crimped sheet may be a paper sheet that does not generate off-flavor due to heat even when heated to a high temperature. However, embodiments are not limited thereto.

The first portion 310 may extend to about 7 to about 20 mm from a distal end of the aerosol generating article 300, and the second portion 320 may extend to about 7 to about 20 mm from an end of the first portion 310. However, embodiments are not limited to this numerical range, and the length to which each of the first portion 310 and the second portion 320 extends, may be properly adjusted within a range in which a person skilled in the art may easily change.

The second portion 320 may include a tobacco material. The tobacco material may be provided in various forms. For example, the tobacco material may be in the form of tobacco cut filler, tobacco particles, tobacco sheets, tobacco beads, tobacco granules, tobacco powder or tobacco extract. Also, the tobacco material may include, for example, at least one of tobacco leaves, tobacco ribs, expanded tobacco, pipe tobacco, tobacco sheet, and reconstituted tobacco.

The third portion 330 may cool an airflow which has passed through the first portion 310 and the second portion 320. The third portion 330 may be made of a polymer material or a biodegradable polymer material, and may have a cooling function. For example, the third portion 330 may be made of polyactic acid (PLA) fiber, but embodiments are not limited thereto. Alternatively, the third portion 330 may include a cellulose acetate filter having a plurality of holes therein. However, the third portion 330 is not limited to the above-described example, and any material capable of cooling an aerosol may be used without limitation. For example, the third portion 330 may be a hollow tube filter or paper tube filter.

The fourth portion 340 may include a filter material. For example, the fourth portion 340 may be a cellulose acetate filter. The shape of the fourth portion 340 is not limited. For example, the fourth portion 340 may be a cylindrical rod, or a tubular rod including a cavity therein. As another example, the fourth portion 340 may be a recess type rod. The fourth portion 340 includes a plurality of segments, and at least one of the plurality of segments may be have a different shape.

The fourth portion 340 may also be manufactured to generate flavor. In an example, a flavoring liquid may be injected into the fourth portion 340. As another example, a fiber to which the flavoring liquid is applied may be inserted into the fourth portion 340.

The aerosol generating article 300 may include a wrapper 350 that partially or completely surrounds the first portion 310 through the fourth portion 340. The wrapper 350 may be the outermost layer of the aerosol generating material 300, and the wrapper 350 may be a single wrapper or a combination of a plurality of wrappers.

In an example, the first portion 310 of the aerosol generating article 300 may include a crimped wrinkled sheet including the aerosol generating material, and the second portion 320 may include a tobacco material (e.g., tobacco filler) and a moisturizer (e.g., glycerin), and the third portion 330 may include a paper tube, and the fourth portion 340 may include cellulose acetate (CA) fibers. However, the present disclosure is not limited thereto.

FIG. 6 is a view illustrating a procedure in which the aerosol generating article 300 of FIG. 5 is accommodated and heated in the heater assembly 100 according to the embodiment of FIG. 4.

Referring to FIG. 6, the aerosol generating article 300 is accommodated in the heater assembly 100 according to the embodiment of FIG. 2. However, the arrangement of the heater assembly 100, the accommodation portion 110, the heating portion 140, and the combining portion 130 shown in FIG. 6 is just an example, and embodiments are not limited thereto. In FIG. 6, the heating portion 140 includes an induction heating type heater including the susceptor S and the coil C, but embodiments are not limited thereto. For example, an electro-resistive heater may be arranged.

When the aerosol generating article 300 is accommodated in the heater assembly 100, the first portion 310 of the aerosol generating article 300 may be surrounded by the accommodating portion 110, and the second portion 320 of the aerosol generating article 300 may be surrounded by the heating portion 140. By this arrangement, the heating temperatures of the first portion 310 and the second portion 320 of the aerosol generating article 300 may be controlled to be different from each other.

Also, the boundary between the first portion 310 and the second portion 320 of the aerosol generating article 300 may be surrounded by the combining portion 130. The second portion 320 including a tobacco material may require a higher heating temperature than the first portion 310 including the aerosol generating material. Because the boundary between the first portion 310 and the second portion 320 is surrounded by the combining portion 130, heat transferred from the heating portion 140 to the first portion 310 may be reduced.

FIG. 7 is a perspective view schematically illustrating a heater assembly 100 according to another embodiment, and FIG. 8 is a cross-sectional view schematically illustrating the heater assembly 100 according to the embodiment of FIG. 7. FIG. 9 is a cross-sectional view schematically illustrating a heater assembly 100 according to another embodiment.

Referring to FIGS. 7 through 9, the heater assembly 100 may further include a heat insulator 150 that is combined with the heating portion 140. The insulator 150 may block at least a portion of the opening (i.e., downstream end) of the accommodation space 101 and blocks movement of heat inside the accommodation space 101 to the outside.

The heat insulator 150 may extend along the circumferential direction at the downstream end of the heating portion 140 having a cylindrical shape. That is, the heating portion 150 may be combined with the entire end of the heating portion 140 so that movement of at least a portion of heat inside the accommodation space 101 to the outside through the end of the heating portion 140 may be blocked.

The heat insulator 150 may extend in the longitudinal direction of the accommodation space 101 to contact the inner side surface and/or the outer side surface of the heating portion 140. As the contact area between the heat insulator 150 and the heating portion 140 increases, the coupling force between the heat insulator 150 and the heating portion 140 may be increased.

The heat insulator 150 may include an insertion hole through which the aerosol generating article is inserted into the accommodation space 101 of the heater assembly 100. The diameter of the insertion hole may be substantially the same as or slightly greater than the diameter of the aerosol generating article. That is, the cross-sectional diameter of the insertion hole may be set to be substantially the same as the cross-sectional diameter of the aerosol generating article so that heat insulation inside the accommodation space 101 of the heater assembly 100 may be guaranteed.

The heat insulator 150 may include engineering plastic so as to resist heat supplied from the heating portion 140. For example, the heat insulator 150 may include the same engineering plastic that is included in the above-described combining portion 130.

FIG. 9 shows an embodiment where the heater assembly 100 includes the susceptor S and the coil C such that the aerosol generating article is heated by induction heating. Also, the heat insulator 150 is arranged at the downstream end of the heating portion 140. These components have been described above, and thus description thereof will be omitted here.

FIG. 10 is a cross-sectional view schematically illustrating a heater assembly 200 according to another embodiment.

Referring to FIG. 10, a heat assembly 200 may include an accommodation portion 210, a first heating portion 220, a combining portion 230, and a second heating portion 240. However, embodiments are not limited thereto, and other general elements than the elements shown in FIG. 10 may be further included in the heater assembly 200.

The accommodation portion 210, the first heating portion 220, the combining portion 230, and the second heating portion 240 may be arranged along the longitudinal direction of the aerosol generating article and may form an accommodation space 201 in which the aerosol generating article is accommodated. For example, the accommodation space 201 may have a cylindrical shape. Also, the diameter of the accommodation space 201 having a cylindrical shape may be substantially the same as or slightly greater than the cross-sectional diameter of the accommodated aerosol generating article.

The accommodation portion 210 may accommodate at least a portion of the aerosol generating article. Here, the accommodation portion 210 may correspond to the end accommodation portion 111 mentioned in the description of FIGS. 1 and 2. That is, the accommodation portion 210 may support the upstream end of the accommodated aerosol generating article. Hereinafter, a redundant description of the end accommodation portion 111 described in FIGS. 1 and 2 will be omitted.

The first heating portion 220 may be combined with the accommodation portion 210 such that the first heating portion 220 surrounds and heats at least a portion of a side surface of the aerosol generating article. The first heating portion 220 may have a cylindrical shape, and one end of the first heating portion 220 may be engaged with a groove formed in the accommodation portion 210. However, the shapes of the accommodation portion 210 and the first heating portion 220 are not limited thereto, and the accommodation portion 210 and the first heating portion 220 may be modified in various shapes in consideration of easiness and convenience of coupling of the accommodation portion 210 and the first heating portion 220.

The first heating portion 220 may have the length of 5 mm to 10 mm along the longitudinal direction of the accommodation space 201. A first portion of the aerosol generating article may be accommodated inside a space formed by the accommodation portion 210 and the first heating portion 220. The first portion of the aerosol generating article and the first heating portion 220 may have the same length along the longitudinal direction of the accommodation space 201.

The second heating portion 240 may be arranged to surround another portion of the aerosol generating article and may heat the aerosol generating article.

The combining portion 230 may combine the first heating portion 220 and the second heating portion 240 and may include engineering plastic.

The description of the combining portion 130 and the heating portion 140 provided above with reference to FIGS. 1 and 2 may be equally applied to the combining portion 230 and the second heating portion 240. Hereinafter, a redundant description therewith will be omitted.

The combining portion 230 may extend in the longitudinal direction of the accommodation space 201 to contact at least one of the inner side surface of the first heating portion 220 and the outer side surface of the first heating portion 220. Also, the combining portion 230 may extend in the longitudinal direction of the accommodation space 201 to contact at least one of the inner side surface of the second heating portion 240 and the outer side surface of the second heating portion 240.

When the aerosol generating article is inserted into the heater assembly 200, the first portion of the aerosol generating article may correspond to the position of the first heating portion 220, and the second portion of the aerosol generating article may correspond to the position of the second heating portion 240.

Also, the first heating portion 220 and the second heating portion 240 may heat the aerosol generating article at different temperatures from each other. As described above, the first portion and the second portion of the aerosol generating article need to be heated at different temperatures from each other. Since the first portion and the second portion of the aerosol generating article are respectively surrounded by the first heating portion 220 and the second heating portion 240, the first portion and the second portion of the aerosol generating article may be heated differently by controlling the heating temperatures of the first heating portion 220 and the second heating portion 240 differently.

FIG. 11 is a cross-sectional view schematically illustrating a heater assembly 200 according to another embodiment, and FIG. 12 is a view for describing a procedure in which the aerosol generating article 300 of FIG. 5 is accommodated and heated in the heater assembly 200 according to the embodiment of FIG. 13.

Referring to FIGS. 11 and 12, at least one of the first heating portion 220 and the second heating portion 240 may include a susceptor S that is arranged on the inside to face the aerosol generating article 300. The susceptor S may heat the aerosol generating article by induction heating in an alternating magnetic field, and a coil C may be arranged outside the susceptor S and may induce an alternating magnetic field. For example, the first heating portion 220 may be an electro-resistive heater, and the second heating portion 240 may be an induction heating type heater including the susceptor S and the coil C. In another example, as shown in FIG. 11, all of the first heating portion 220 and the second heating portion 240 may be induction heating type heaters.

As described above, the first portion 310 of the aerosol generating article 300 may be surrounded by the first heating portion 220, and the second portion 320 of the aerosol generating article 300 may be surrounded by the second heating portion 240. Also, the boundary between the first portion 310 and the second portion 320 of the aerosol generating article 300 may be surrounded by the combining portion 230.

FIG. 13 is a cross-sectional view schematically illustrating a heater assembly 200 according to another embodiment.

Referring to FIG. 13, the heater assembly 200 may further include a heat insulator 250 that is combined with the second heating portion 240. The insulator 250 may block at least a portion of the opening of the accommodation space 201 and may block movement of heat inside the accommodation space 201 to the outside. The heating portion 150 of FIGS. 8 and 9 may be equally applied to the heat insulator 250, and hereinafter, a redundant description therewith will be omitted.

FIG. 14 is a view illustrating a state in which the aerosol generating article 300 of FIG. 5 is inserted into the aerosol generating device 10 including the heater assembly 100 according to the embodiment of FIG. 9. FIG. 15 is a view illustrating a state in which the aerosol generating article 300 of FIG. 5 is inserted into the aerosol generating device 10 including the heater assembly 100 according to the embodiment of FIG. 11.

Referring to FIGS. 14 and 15, the aerosol generating device 10 may include heater assemblies 100 and 200, a battery 11 for supplying power to the heater assemblies 100 and 200, and a processor 12 for controlling the power supplied to the heat assemblies 100 and 200. However, it will be understood by those skilled in the art that other general components than the components shown in FIGS. 14 and 15 may be further included in the aerosol generating device 10.

FIGS. 14 and 15 illustrate that the battery 11, the processor 12, and the heater assemblies 100 and 200 are arranged in a line. However, the internal structure of the aerosol generating device 10 is not limited to the illustration of FIGS. 14 and 15. In other words, according to the design of the aerosol generating device 10, the battery 11, the processor 12, and the heater assemblies 100 and 200 may be changed.

The description of the heater assemblies 100 and 200 provided above with reference to FIGS. 1-13 may be equally applied to the heater assemblies 100 and 200 of FIGS. 14-15.

When the aerosol generating article 300 is inserted into the aerosol generating device 10, the aerosol generating device 10 may operate the heater assemblies 100 and 200 to generate an aerosol. The aerosol generated by the heater assemblies 100 and 200 may pass through the aerosol generating article 300 and may be delivered to the user.

The battery 11 may supply power to be used for the aerosol generating device 10 to operate. For example, the battery 11 may supply power to heat the heater assemblies 100 and 200, and may supply power for operating the processor 12. Also, the battery 11 may supply power for operations of a display, a sensor, a motor, etc. mounted in the aerosol generating device 10.

The processor 12 may generally control operations of the aerosol generating device 10. In detail, the processor 12 may control not only operations of the battery 11 and the heater assemblies 100 and 200, but also operations of other components included in the aerosol generating device 10. Also, the processor 12 may check a state of each of the components of the aerosol generating device 10 to determine whether or not the aerosol generating device 10 is able to operate.

A processor 12 can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

The invention claimed is:

1. An aerosol generating system comprising:
an aerosol generating article; and
an aerosol generating device comprising a heater assembly,
wherein the heater assembly comprises:
an accommodation portion configured to accommodate an end portion of the aerosol generating article and configured to surround a first portion of the aerosol generating article, the first portion comprising a first material;
a heating portion configured to surround a second portion of the aerosol generating article and configured to heat the aerosol generating article, the second portion comprising a second material that is different from the first material; and
a combining portion comprising engineering plastic combining the accommodation portion and the heating portion, and
wherein the accommodation portion, the combining portion, and the heating portion are sequentially arranged along a longitudinal direction of the aerosol generating article and form an accommodation space in which the aerosol generating article is accommodated.

2. The aerosol generating system of claim 1, wherein the accommodation portion has a length of 5 mm to 10 mm along a longitudinal direction of the accommodation space.

3. The aerosol generating system of claim 1, wherein the engineering plastic comprises at least one selected from the group consisting of polyether ether ketone (PEEK), poly sulfone (PSU), polyether imide (PEI), polyether sulfone (PES), polyphenylene sulfone (PPS), polyimide (PI), and liquid crystal polymer (LCP).

4. The aerosol generating system of claim 1, wherein the combining portion extends in a longitudinal direction of the accommodation space to contact at least one of an inner side surface of the heating portion and an outer side surface of the heating portion.

5. The aerosol generating system of claim 1, wherein the heating portion comprises:
a susceptor arranged in the accommodation space to face the aerosol generating article, and configured to generate heat in an alternating magnetic field; and
a coil arranged outside the susceptor and configured to induce the alternating magnetic field.

6. The aerosol generating system of claim 1, further comprising a heat insulator combined with the heating portion, and configured to block movement of heat inside the accommodation space to an outside by blocking a portion of an opening of the accommodation space.

7. An aerosol generating system, comprising:
an aerosol generating article; and
an aerosol generating device comprising a heater assembly,
wherein the heater assembly comprises:
an accommodation portion configured to accommodate an end portion of the aerosol generating article;
a first heating portion combined with the accommodation portion, configured to surround a first portion of the aerosol generating article, and configured to heat the aerosol generating article, the first portion comprising a first material;
a second heating portion configured to surround a second portion of the aerosol generating article, and configured to heat the aerosol generating article, the second portion comprising a second material that is different from the first material; and a combining portion comprising engineering plastic and combining the first heating portion and the second heating portion, and wherein the accommodation portion, the first heating portion, the combining portion, and the second heating portion are sequentially arranged along a longitudinal direction of the aerosol generating article and form an accommodation space in which the aerosol generating article is accommodated.

8. The aerosol generating system of claim 7, wherein the first heating portion has a length of 5 mm to 10 mm along a longitudinal direction of the accommodation space.

9. The aerosol generating system of claim 7, wherein the engineering plastic comprises at least one selected from the group consisting of polyether ether ketone (PEEK), poly sulfone (PSU), polyether imide (PEI), polyether sulfone (PES), polyphenylene sulfone (PPS), polyimide (PI), and liquid crystal polymer (LCP).

10. The aerosol generating system of claim 7, wherein the combining portion extends in a longitudinal direction of the accommodation space to contact at least one of an inner side surface of the first heating portion and an outer side surface of the first heating portion, and extends in the longitudinal direction of the accommodation space to contact at least one of an inner side surface of the second heating portion and an outer side surface of the second heating portion.

11. The aerosol generating system of claim 7, wherein at least one of the first heating portion and the second heating portion comprises:

a susceptor arranged in the accommodation space to face the aerosol generating article, and configured to generate heat in an alternating magnetic field; and a coil arranged outside the susceptor and configured to induce the alternating magnetic field.

12. The aerosol generating system of claim 7, wherein the first heating portion and the second heating portion are configured to heat the aerosol generating article at different temperatures.

13. The aerosol generating system of claim 7, further comprising a heat insulator combined with the second heating portion, and configured to block movement of heat inside the accommodation space to an outside by blocking at least a portion of an opening of the accommodation space.

* * * * *